Feb. 23, 1965  J. McINTOSH CAIRNIE  3,170,675
MULCH PREPARING AND SPREADER MACHINE
Filed Oct. 19, 1962  3 Sheets-Sheet 1

INVENTOR
JOHN McINTOSH CAIRNIE
ATTORNEY

Feb. 23, 1965    J. McINTOSH CAIRNIE    3,170,675
MULCH PREPARING AND SPREADER MACHINE
Filed Oct. 19, 1962    3 Sheets-Sheet 2
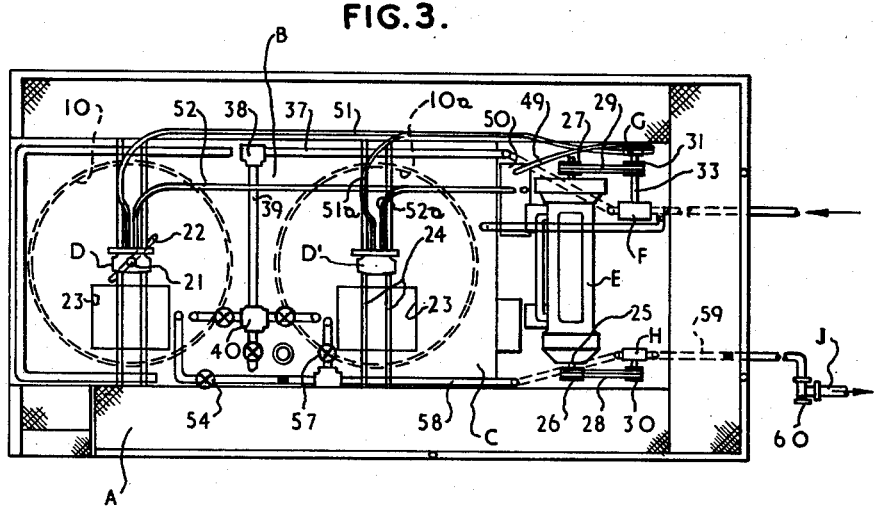
FIG. 3.
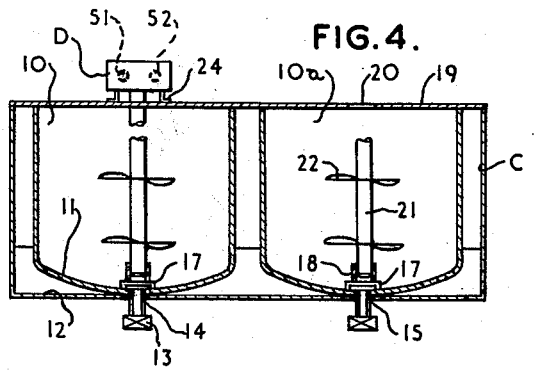
FIG. 4.
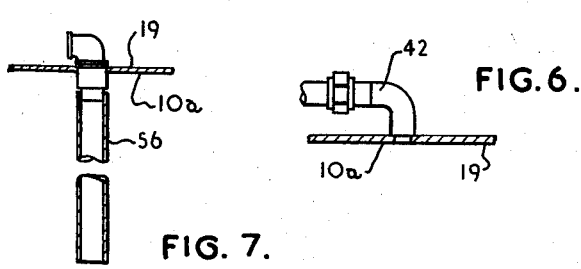
FIG. 6.
FIG. 7.
INVENTOR
JOHN McINTOSH CAIRNIE
ATTORNEY

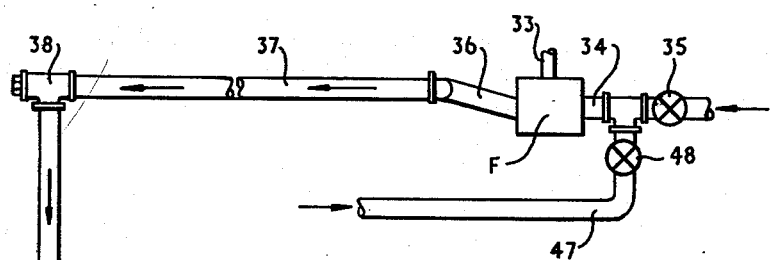
FIG. 5.
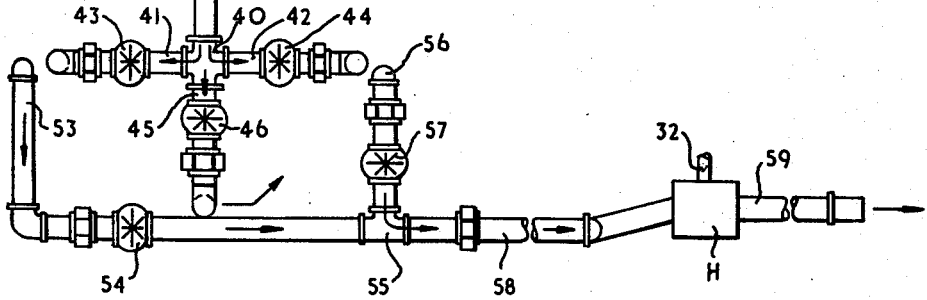
INVENTOR
JOHN McINTOSH CAIRNIE
ATTORNEY

United States Patent Office 3,170,675
Patented Feb. 23, 1965

3,170,675
MULCH PREPARING AND SPREADER MACHINE
John McIntosh Cairnie, 89 Pine St. N., Thorold,
Ontario, Canada
Filed Oct. 19, 1962, Ser. No. 231,731
11 Claims. (Cl. 259—6)

My invention relates to a mulch preparing and spreader machine designed for mixing an intimate mulch of suitable substances and using water as a carrying medium or agent, and the mulch so formed may be delivered and spread over selected terrain so that an even coverage of mulch of a desired thickness may be spread over the terrain.

This machine may be used for many purposes such as seeding bankings of roadways to prevent erosion or disintegration of the surface terrain due to wind, rain, excessive snow etc., landscaping new housing developments, laying a protective cover on reforestation projects and the like.

The machine is self contained and mounted on a suitable vehicle which may be driven or transported to the place or scene of operation and the machine can function either on the terrain or adjacent to the terrain which is being treated with a surface dressing of such mulch.

Terrain adjacent to highways is frequently banked or buttressed with soil, and erosion or disintegration of the soil constituting these banks may arise or take place due to atmospheric conditions. The efficiency of the banks etc. could be impaired or damaged by winds or rain and such damage might and could be transmitted to the highway protected by the banking, and the safety of the highway might be seriously impaired due to the damaging of such banking.

To correct such conditions it has been the practice to seed the road-side areas and to cover them with straw but this is a slow process and not infrequently the banks are washed away before the turf is established. Sometimes it has been found best to cover the surfaces of the bank with sods, but these sods require to be pegged in position until knitting of the sods takes place. It will be apparent that the displacement of any of these sods may impair the practical benefits which sodding is designed to give to the terrain. Sodding is a slow and expensive method of treating or landscaping ground and it is not always as efficient as it is hoped for.

As already mentioned, it is not uncommon to cover the surface of banking etc. with mattresses of straw after the seeding or with straw that is impregnated with grass seed, but here again the mattresses must be interconnected with each other and/or pegged in position so that they may function in the manner desired of them.

After serious consideration of this problem I have come to the conclusion that the difficulty of maintaining banking, buttresses and other terrain adjacent to a highway in a serviceable condition can be overcome and the terrain best preserved by uniformly coating the surface of the terrain with a covering of aqueous homogeneous mulch containing pulp, peat moss or other similar vegetable matter which can be readily mixed with the desired additives such as a predetermined proportion of grass seed, fertilizer, colouring matter or the like and this mixture when of the desired consistency discharged by spraying or other means to uniformly cover the surface of the terrain to an effective and desired depth.

The following objects had to be complied with in order to obtain an effective solution of my problem.

One of the objects of my invention is to provide a portable machine which may be transported to the scene of operations, and a homogeneous aquamulch discharged over preselected terrain to form a covering of uniform thickness extending over the exposed surface of the terrain for the purpose of binding and protecting the surface against erosion and disintegration.

A further object of my invention is to maintain the aquamulch in a constant state of agitation prior to its discharge over the terrain being treated, so that the aquamulch is homogeneous and of uniform density throughout the complete covering formed on the said terrain.

A further object of my invention is to provide a machine having two mulch mixing chambers which may be separately supplied from a common water reservoir, and thus allow preparation of a batch of the aquamulch in one mixing chamber while the other mixing chamber is being discharged, the alternating use of the two mixing chambers permitting the mulch-spreading operation being carried out as an uninterrupted and continuous process.

A further object of my invention is to operatively mount the several parts of the aquamulch machine on a suitable vehicle such as a truck or a trailer which may be connected to or equipped with a tractor so that the same may be moved with facility from one place of operation to another, the machine being provided with a separate motor designed to operate the several mechanisms required as for the loading of the tanks, the efficient mixing of the mulch and discharge of the mulch as and when required.

A further object of my invention is to incorporate a distinguishing green colouring matter into the mulch during the mixing thereof, so that when the mulch is ready for discharging on a predetermined piece of terrain it will be clearly discernible to what extent the coverage has been carried out and what terrain still remains to be covered. This provides for the continuity of the mulch being effectively carried out on the terrain since the contrasting colour between the mulch treated portion and the remainder of the terrain will be readily discernible.

A further object of my invention is to provide a machine having a plurality of mulch containers connected with a common reservoir and capable of being consecutively filled from the reservoir and supplied with mulching and other materials, agitating means in each container and means consecutively discharging the mixed mulch from the respective containers in the same sequence as in filling the containers to deliver a continuous flow of homogeneous mulch for an uninterrupted operation.

A still further object of my invention is to provide a machine having a plurality of mulch-treating containers each designed to receive and agitate a charge of water and mulching material and to alternately discharge homogeneous mixed mulch under pressure and a water reservoir for individually supplying the containers during each cycle of filling and discharging the containers, each cycle of operations including the consecutive filling and discharging of each of the containers at least once.

Other objects of my invention will be made clear as the specification develops.

So that the nature of my invention will be clearly understood I have illustrated an embodiment of the same which I shall describe in detail, but I wish it to be understood that I do not limit my invention to this specific embodiment but reserve the right to change and modify the same within the scope of my appended claims without departing from the spirit of my invention.

In the drawings:

FIGURE 3 is a plan view of the mulch machine;

FIGURE 4 is a longitudinal vertical section through the mulch machine showing two mixing chambers and surrounding water reservoir;

FIGURE 5 is a schematic plan of the fluid supply system;

FIGURE 6 is a detail of the fluid feed to the mixing chamber;

FIGURE 7 is a sectional detail of the chamber discharge pipe; and

Like characters of reference refer to like parts in the several figures of the drawings.

Figure 1:
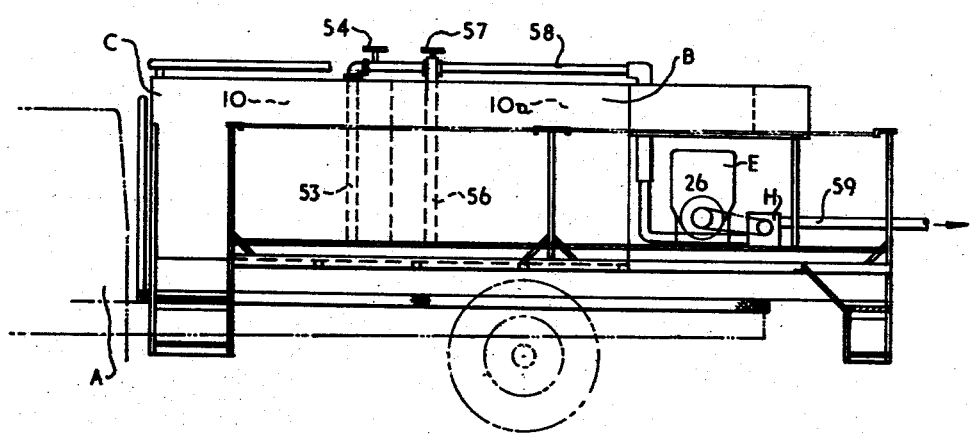
FIGURE 1 is a side elevation of my aquamulch machine as mounted on a conventional truck.
Figure 2:
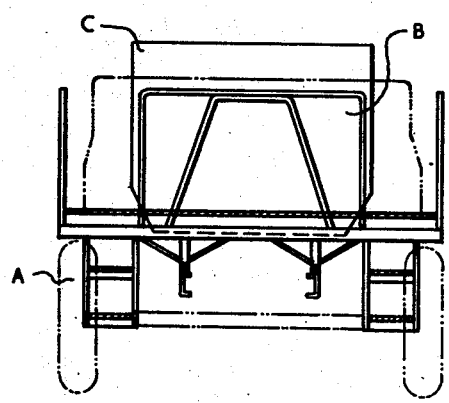
FIGURE 2 is a rear elevation of the same.
Figure 8:
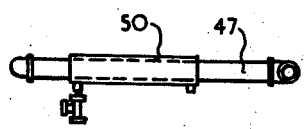
FIGURE 8 is an elevational detail of the cooler for the impellent of the mixing chamber rotors.

Referring to the drawings, A refers to a truck body, on the deck of which my mulch machine B is mounted or installed. The truck A is provided at the front end with a tractor of conventional type (not shown), so that the truck may be readily transported to the place or district at which the actual mulch machine is to be used.

The mulching machine B comprises a casing or reservoir C which is substantially rectangular in shape, and within the precincts of the casing C a pair of mixing chambers 10 and 10a are located. Each of these mixing chambers is cylindrical in shape and the lower end of each chamber is closed with a downwardly projecting convex end 11 which rests on the bottom wall 12 of the reservoir C.

Each of the chambers 10 and 10a is formed with a discharge drain 13 which may be fabricated from a pipe adapted to pass through registering orifices 14 and 15 in the bottom of the chambers 10 and 10a and the bottom wall of the casing or reservoir C.

Each of the drain pipes 13 is retained in position by welding and each pipe is equipped with a drain valve 16 permitting the chambers 10 and 10a to be drained for any essential purpose. Each drain pipe 13 is bridged by an inverted U-shaped saddle 17 which is welded to or otherwise connected with the inner concave face of the bottom closure member 11 of the chambers 10 and 10a, and on the upper face of each saddle a foot or step bearing is provided.

The upper end of the reservoir C is closed by a cover 19 provided with two apertures 20 and these may constitute bearings for the vertically disposed agitator shafts 21 each of which is provided with a plurality of breakers or paddles 22 so that as the shafts 21 are rotated the contents of each chamber 10 and 10a will be thoroughly and uniformly mixed. By reference to FIGURE 4 of the drawing it will be seen that the lower end of the shaft 21 is reduced to form a thimble which engages the step bearing 18 but the lower end of the shaft is spaced from the foot of the bearing.

The cover 19 may be permanently secured to the reservoir C by welding and since it is co-extensive with the top of the reservoir I have provided two inlet openings 23, one for each mixing chamber 10 and 10a and these openings may be closed by a suitable removable cover (not shown).

Each shaft 21 is drawn by an individual rotor D and D' and each rotor is supported above and in spaced relation to the cover 19 of the reservoir C by the transversely extending parallel angle or channel bars 24 which are arranged in pairs. It will be noted that the inlet openings 23 are positioned to permit of unimpeded loading or charging of the mixing chambers 10 and 10a with peat moss, seeds and colouring matter in a predetermined proportion.

On the deck of the truck A I provide a prime mover E such as a gasoline engine whose drive shaft 25 extends beyond each end of the engine casing, and the shaft carries the drive pulleys 26 and 27 on its opposite ends and these pulleys are connected by belt drives 28 and 29 with the pulleys 30 and 31 on the shafts 32 and 33. The shaft 33 is operatively connected with the two pumps F and G while the shaft 32 is connected to the pump H.

The pump F is connected to a suction pipe 34 provided with a valve 35 and this suction pipe may be connected by a suction hose to a source of water supply. The discharge pipe 36 of the pump F is connected to a line pipe 37 which in turn is connected by the T-shaped pipe fitting 38 with the upper end of the pipe 39. The lower end of the pipe 39 is connected to the four way pipe fitting 40 which has its two lateral arms connected to the pipes 41 and 42 which in turn are connected to the mixing containers 10 and 10a respectively. I provide valves 43 and 44 in the pipes 41 and 42.

The remaining arm of the four way pipe fitting 40 is connected by the pipe 45 with the reservoir C and a valve 46 is provided in the pipe 45. The suction pipe 34 is provided intermediate of its length and between the valve 35 and the pump F with a branch pipe 47 which is connected to the reservoir C, and this pipe 47 is provided with a valve 48.

The pump G which is connected to the shaft 33 is provided with a suction pipe 49 which is connected to the reservoir 50 containing an impelling fluid such as oil etc. The discharge end of the pump G is connected by the discharge pipe 51 with the rotor D which in turn is connected by the pipe 52 with the reservoir 50 so that the impelling fluid flows in a closed cycle from the reservoir 50 through the pipe 49, the pump G, the discharge pipe 51, the rotor D and the return pipe 52 to the reservoir 50.

It will be noted that a branch pipe 51a connects with the second rotor D' with the pipe 51 and that a branch pipe 52a connects the rotor D' with the return pipe 52 so that the rotor D' is also included in a closed cycle.

During the operation of the prime mover E the belt drive 29 drives the shaft 33 and the pump G, and the continued operation of the pump drives the rotors D and D' continuously so that the agitator shaft 21 are continuously rotated and the paddles 22 maintain the mulch in the containers 10 and 10a constantly in operation even during the loading and discharging of the containers 10 and 10a.

To discharge the mulch from the container 10 and 10a. I provide a discharge pipe 53 extending into the lower end of the container 10, and this pipe is provided with a valve 54. The pipe 53 is connected to a T fitting 55 which in turn is connected with the pipe 56, the inlet end of which is located within the container 10a. There is a valve 57 in the pipe 56.

The T-shaped fitting 55 is connected by a pipe 58 with the intake of the pump H, and the discharge of this pump is connected to the discharge pipe 59. A valve 60 is located in the pipe 59 and the end of the pipe extending beyond the valve 60 is connected to a spraying hose J.

The operation of my machine is as follows. The valves 54 and 57 are closed, and the valves 43 and 44 of the water supply system are open and likewise the valve 46 in the pipe 45 is also opened. The valve 35 in the pipe 34 is opened and the valve 48 of the branch pipe 47 is closed.

The prime mover E is set in motion or started, and water from the source of supply flows through the open valve 35, suction pipe 34, pump F, discharge pipe 36, line pipe 37, the knee connection 38 and pipe 39, and delivers water through the valve 43 and the pipe 41 into the container 10, and water is simultaneously discharged through the valve 44 and pipe 42 into the container 10a. Simultaneously water is delivered through the pipe 45 and valve 46 into the reservoir C.

During the operation of the prime mover E the pump

G is driven from the belt drive 29 to the shaft 33 rotating the pump G and a fluid under pressure is drawn from the reservoir 50 through the pipe 49, the pump G, the discharge pipe 51, to the rotor D and the exhaust fluid from the rotor D is delivered to the pipe 52 and returned to the reservoir 50.

Part of the fluid passing through the pipe 51 is by-passed through the pipe 51a to the rotor D', and the exhaust from this rotor passes through the pipe 52a which connects with the pipe 52, so that the exhaust from the rotor D' is returned to the reservoir 50.

Since the pump G is operating at all times that the prime mover E is in commission, then the rotors D and D' operating in a closed cycle continuously rotate the agitator shaft 21, so that the paddles 22 are in constant rotation within the compartments 10 and 10a, and thus the contents of these containers are in a constant state of agitation.

When the compartment 10 is deemed to be in proper condition to be discharged, then the valve 54 in the pipe 53 is opened and the valve 60 in the discharge pipe of the pump H is opened and the contents of the compartment 10 flows through the pipe 53, valve 54, pipe 58, pump H, discharge pipe 59 and the valve 60 and delivered to a spraying hose. During the complete period of emptying the container 10, the agitator shaft 21 in that container is in constant operation so that the mulch discharged is uniform in density throughout its complete bulk.

When the container 10 has been emptied, then the valve 54 is closed and water is delivered into the container 10 from the pump F connected to the reservoir C, the discharge pipe 36, line pipe 37, pipe 39 through the valve 43, pipe 41 to the container 10.

When the container 10 has been filled, then the valve 43 is closed and the mulch material is charged into the container 10 through the opening 23 in the cover 19. In the meantime container 10a is being discharged and the mulching material and water in container 10 is being thoroughly agitated to form a homogeneous mixture.

It will be noted that the rotors D and D' are in constant use and the agitator shafts 21 depending from these rotors constantly agitate the mixture in the compartments 10 and 10a.

What is claimed as new is:

1. A mulching and spreading machine comprising a pair of mulch receiving chambers, means for mixing mulch in the chambers, a water containing reservoir embracing the chambers and connected to each chamber, a fluid supply system including means for delivering water to the reservoir from a source of supply, means for modifying the last said means to cut off the water supply, means for circulating the fluid in the reservoir and around the chambers in a closed cycle and of individually supplying the same to each of said chambers and means for discharging mulch from the chamber.

2. A machine for preparing and spreading mulch comprising at least two mixing chambers in which water and solids may be combined in a mulch suitable for spraying; a water reservoir embracing the mixing chambers; means for delivering water from the reservoir to one chamber while discharging mulch from the other chamber and vice versa; means for continuously agitating water in one chamber and mulch in the other chamber; and means for spraying the discharging mulch to a terrain to surface the same.

3. A machine for preparing and spreading mulch comprising at least two mixing chambers in which water and solids may be combined in a mulch suitable for spraying; a water reservoir embracing the mixing chambers; means for delivering water from the reservoir to one chamber during the discharge of mulch from the other chamber and vice versa; shafts carrying mixing paddles depending into each chamber; a rotor for each shaft means controlling the simultaneously rotation of the shafts; and means for spraying the discharging mulch from a chamber to a terrain to surface the same.

4. The machine for preparing and spreading mulch claimed in claim 3 in which step bearings are provided in the bottom of the mixing chambers to engage the lower end of the said shafts.

5. The machine for preparing and spreading mulch claimed in claim 3 in which each mixing chamber has a valved drain opening in the bottom thereof, a bridge straddling the drain opening and a step bearing for the lower end of the respective chamber's shaft mounted on said bridge.

6. A machine for preparing and spreading mulch comprising at least two mixing chambers; a water reservoir embracing the mixing chambers; means for delivering water from the reservoir to one chamber while discharging mulch from the other chamber; shafts, carrying mixing paddles, depending into each chamber; a bearing for the lower end of each shaft on the bottom of its respective chamber; a rotor on the upper end of each shaft disposed above the reservoir; means for impelling fluid under pressure to each rotor in a closed cycle; and means for spraying discharged mulch from a container to a terrain to surface the same.

7. A machine for preparing and spreading mulch comprising a mobile wheeled vehicle; a water reservoir mounted thereon; at least two mixing chambers disposed in said reservoir; an agitator in each chamber; power operated means for selectively delivering water from said reservoir to each of said chambers; and power operated means for selectively delivering the contents of each of said mixing chambers to the terrain adjacent the vehicle.

8. A machine for preparing and spreading mulch comprising a mobile wheeled vehicle; a water reservoir mounted thereon; at least two mixing chambers disposed in said reservoir; an agitator in each chamber; power operated means for filling one chamber at a time from said reservoir without effecting the operation of the other chamber; and power operated means for selectively delivering the contents of each of said mixing chambers to the terrain adjacent the vehicle.

9. A machine for preparing and spreading mulch comprising a mobile wheeled vehicle; a water reservoir mounted thereon; at least two mixing chambers disposed in said reservoir; an agitator in each chamber; power operated means for selectively delivering water from said reservoir to each of said chambers including a pump, a conduit from the reservoir to the pump, and valved conduits between the pump and the reservoir and each of the chambers; and power operated means for selectively delivering the contents of each of said mixing chambers to the terrain adjacent the vehicle.

10. A machine for preparing and spreading mulch comprising a mobile wheeled vehicle; a water reservoir mounted thereon; at least two mixing chambers disposed in said reservoir; an agitator in each chamber; power operated means for selectively delivering water from said reservoir to each of said chambers including a continually operating pump having an input conduit from the reservoir and an output conduit with individually valved branches leading respectively to the reservoir and each of the chambers; an inlet opening in each chamber through which solids may be added to the water therein; a cover for each such opening; and power operated means for successively spraying the contents of each of said mixing chambers to the terrain adjacent the vehicle.

11. A machine for preparing and spreading mulch comprising a mobile wheeled vehicle; a water reservoir mounted thereon; at least two mixing chambers disposed in said reservoir; an agitator in each chamber; a power operated pump continuously circulating the water in said reservoir, selectively delivering it when desired to either chamber; and power operated means for spraying the contents of said mixing chambers one after the other to the terrain adjacent the vehicle, including a pump, a valved conduit to the pump from each mixing chamber and a discharge pipe from the pump to a spraying hose, said valved conduits extending to the bottom of their respective chambers.

References Cited by the Examiner

UNITED STATES PATENTS

| | | | |
|---|---|---|---|
| 1,861,721 | 6/32 | Scott | 259—7 |
| 2,530,720 | 11/50 | Paulson | 15—82 |

CHARLES A. WILLMUTH, *Primary Examiner.*